(12) United States Patent
Zhang et al.

(10) Patent No.: US 10,528,826 B2
(45) Date of Patent: Jan. 7, 2020

(54) VEHICLE GUIDANCE SYSTEM

(71) Applicant: GM Global Technology Operations LLC, Detroit, MI (US)

(72) Inventors: Wende Zhang, Troy, MI (US); Adrienne M. Williamson, Rochester Hills, MI (US); Esther Anderson, Canton, MI (US); Jinsong Wang, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 317 days.

(21) Appl. No.: 15/410,084

(22) Filed: Jan. 19, 2017

(65) Prior Publication Data

US 2017/0320433 A1    Nov. 9, 2017

Related U.S. Application Data

(60) Provisional application No. 62/332,986, filed on May 6, 2016.

(51) Int. Cl.
| | | |
|---|---|---|
| *G01S 13/93* | (2006.01) | |
| *G01S 15/93* | (2006.01) | |
| *G06K 9/00* | (2006.01) | |
| *B62D 15/02* | (2006.01) | |

(Continued)

(52) U.S. Cl.
CPC ........ *G06K 9/00805* (2013.01); *B62D 15/023* (2013.01); *G01S 13/862* (2013.01); *G01S 13/865* (2013.01); *G01S 13/867* (2013.01); *G01S 13/931* (2013.01); *G01S 15/931* (2013.01); *G01S 17/936* (2013.01);

(Continued)

(58) Field of Classification Search
CPC .............. G06K 9/00805; B62D 15/023; B62D 15/029; B62D 15/0295; G01S 13/862; G01S 13/865; G01S 13/867; G01S 13/931; G01S 15/931; G01S 17/023; G01S 17/936; G01S 19/13; G01S 2013/9353; G01S 2013/9364; G01S 2013/9367; G01S 2013/9375; G01S 2013/9378
USPC ......................................................... 342/54
See application file for complete search history.

(56) References Cited

U.S. PATENT DOCUMENTS 9,804,597 B1 * 10/2017 Ferguson ............. G05D 1/0231
2006/0287825 A1 * 12/2006 Shimizu ................. B60K 35/00
                                                               701/516

(Continued)

*Primary Examiner* — Timothy X Pham
(74) *Attorney, Agent, or Firm* — Cantor Colburn LLP

(57) ABSTRACT

A vehicle guidance system assists a driver in maneuvering a vehicle with respect to an object in a scene. The system includes a steering angle sensor, a camera device, a video processing module (VPM), and a human-machine interface (HMI). The sensor is configured to monitor the angular position of a vehicle wheel. The device is configured to capture an original image of a scene having the object. The VPM is configured to receive and process the original image from the device, detect the object in the original image, receive and process the angular position from the sensor, generate a vehicle trajectory based on the angular position, and orientate the trajectory with regard to the object. The HMI is configured to display a processed image associated with the original image and a trajectory overlay associated with the trajectory from the VPM. Together, the object is displayed in relation to the overlay.

19 Claims, 4 Drawing Sheets

(51) Int. Cl.
*G01S 17/93* (2006.01)
*G01S 13/86* (2006.01)

(52) U.S. Cl.
CPC ............. *G01S 2013/9364* (2013.01); *G01S 2013/9367* (2013.01)

(56) References Cited

U.S. PATENT DOCUMENTS

| | | | | |
|---|---|---|---|---|
| 2006/0287826 | A1* | 12/2006 | Shimizu | B60K 35/00 |
| | | | | 701/431 |
| 2007/0288133 | A1* | 12/2007 | Nishira | G05D 1/0214 |
| | | | | 701/23 |
| 2009/0290032 | A1 | 11/2009 | Zhang et al. | |
| 2010/0209889 | A1* | 8/2010 | Huang | B60W 40/09 |
| | | | | 434/65 |
| 2013/0274985 | A1 | 10/2013 | Lee et al. | |
| 2013/0321629 | A1* | 12/2013 | Zhang | H04N 17/002 |
| | | | | 348/148 |
| 2014/0085409 | A1 | 3/2014 | Zhang et al. | |
| 2014/0085474 | A1* | 3/2014 | Lee | B62D 15/0275 |
| | | | | 348/148 |
| 2015/0329048 | A1 | 11/2015 | Wang et al. | |
| 2017/0072850 | A1* | 3/2017 | Curtis | B60W 50/0097 |
| 2017/0076606 | A1* | 3/2017 | Gupta | B60K 35/00 |
| 2017/0131719 | A1 | 5/2017 | Micks et al. | |
| 2017/0305418 | A1* | 10/2017 | Bae | B60W 50/0098 |
| 2018/0373265 | A1* | 12/2018 | Ueda | G01C 21/165 |

* cited by examiner

VEHICLE GUIDANCE SYSTEM

CROSS-REFERENCE TO RELATED APPLICATION

This application is a Non-Provisional of U.S. Provisional Patent Application Ser. No. 62/332,986 filed May 6, 2016, the disclosure of which is herein incorporated by reference in its entirety.

INTRODUCTION

The subject invention relates to a vehicle guidance system, and more particularly, to overlays depicted on an image to guide a driver with respect to an object.

Vehicles are known to include one or more camera devices that provide, for example, back-up assistance, parking assistance, images of roadway conditions, images of roadway display signs, and other features. Such features may simply alert a driver of a condition or may assist a driver in maneuvering about an obstacle. In many vehicle guidance systems, however, the driver is required to recognize the obstacle via a captured image viewed by the driver on a display screen. Other vehicle guidance systems may include limited, computer-based, obstacle recognition capability with the ability to audibly or visually alert the driver.

It is desirable to enhance obstacle recognition capability and/or provide improved viewing and dynamic overlays on a captured image to assist a driver in maneuvering the vehicle with respect to the obstacle and/or other objects.

SUMMARY

In one exemplary, non-limiting, embodiment of the present disclosure, a vehicle guidance system assists a driver in maneuvering a vehicle with respect to an object in a scene. The vehicle includes a wheel having a range of angular positions steered by the driver. The vehicle guidance system includes a steering angle sensor, a camera device, a video processing module (VPM), and a human-machine interface (HMI). The steering angle sensor is configured to monitor the angular position of the wheel. The camera device is configured to capture an original image of a scene having the object. The VPM is configured to receive and process the original image from the camera device, detect the object in the original image, receive and process the angular position from the steering angle sensor, generate a vehicle trajectory based on the angular position, and orientate the vehicle trajectory with regard to the object. The HMI is configured to display a processed image associated with the original image and a trajectory overlay associated with the vehicle trajectory from the VPM. Together, the object is displayed in relation to the trajectory overlay.

Additionally to the foregoing embodiment, the VPM includes object recognition software for at least assisting in detection of the object.

In the alternative or additionally thereto, in the foregoing embodiment, the object recognition software is appearance-based software.

In the alternative or additionally thereto, in the foregoing embodiment, the object recognition software is motion-based software.

In the alternative or additionally thereto, in the foregoing embodiment, the vehicle guidance system includes an external detection device module in communication with the VPM, the external detection device module including at least one of a vehicle-to-infrastructure transceiver and a vehicle-to-vehicle transceiver configured to at least in-part assist the VPM in detection of the object.

In the alternative or additionally thereto, in the foregoing embodiment, the VPM includes historical information to at least in-part assist the VPM in detection of the object.

In the alternative or additionally thereto, in the foregoing embodiment, the vehicle guidance system includes at least one of a vehicle-to-infrastructure (V2I) transceiver, a vehicle-to-vehicle (V2V) transceiver, and a remote server transceiver, and wherein the historical information includes external historical information received from at least one of the V2I transceiver, the V2V transceiver, and the remote server transceiver.

In the alternative or additionally thereto, in the foregoing embodiment, the external historical information includes at least one of location of the object, shape of the object and color of the object, and the external historical information is received via the V2I transceiver.

In the alternative or additionally thereto, in the foregoing embodiment, the historical information includes internal historical information electronically stored by the VPM.

In the alternative or additionally thereto, in the foregoing embodiment, the internal historical information is recorded by the vehicle guidance system from a previous visit of the vehicle to the scene.

In the alternative or additionally thereto, in the foregoing embodiment, the vehicle guidance system includes a surrounding view system including the camera device being a forward camera device, a rearward camera device and at least one side camera device configured to capture images to generate the internal historical information.

In the alternative or additionally thereto, in the foregoing embodiment, the vehicle guidance system includes a global positioning system (GPS) device configured to detect a location of the object.

In the alternative or additionally thereto, in the foregoing embodiment, the vehicle guidance system includes at least one of an ultrasonic device and a radar device configured to at least assist in detection of the object.

In the alternative or additionally thereto, in the foregoing embodiment, the vehicle guidance system includes a vehicle-to-infrastructure transceiver configured to receive information based on at least one of location, shape and color of the object to assist in detection of the object.

In the alternative or additionally thereto, in the foregoing embodiment, the vehicle guidance system includes a surrounding view system including the camera device being a forward camera device, a rearward camera device and at least one side camera device configured to capture images of the object from a previous visit to generate at least a portion of internal historical information stored by the VPM to enhance detection of the object.

In the alternative or additionally thereto, in the foregoing embodiment, at least one of the ultrasonic device and the radar device are configured to generate internal historical information from a previous visit to enhance detection of the object.

In the alternative or additionally thereto, in the foregoing embodiment, the vehicle guidance system includes at least one of a vehicle-to-vehicle (V2V) transceiver, and a remote server transceiver configured to receive external historical information and send the external historical information to the VPM for object detection enhancement.

In the alternative or additionally thereto, in the foregoing embodiment, the VPM is configured to adjust extrinsic calibration information to enhance the processed image.

In the alternative or additionally thereto, in the foregoing embodiment, the vehicle guidance system includes at least one of a vision-based module for object detection, a vehicle-to-infrastructure (V2I) module for object detection, a sensor fusion module for object detection, a vehicle-to-vehicle (V2V) module for object detection, an OnStar module for object detection, and a vehicle history module for object detection.

In the alternative or additionally thereto, in the foregoing embodiment, the vehicle guidance system includes at least two of an ultrasonic device, a radar device, and a light detection and ranging (LiDAR) device, and wherein the sensor fusion module is configured to fuse data from the at least two of the ultrasonic device, the radar device, and the LiDAR device.

In the alternative or additionally thereto, in the foregoing embodiment, the vehicle history module is a host vehicle history module configured to utilize at least one of a map, a GPS, and a past detection input.

In the alternative or additionally thereto, in the foregoing embodiment, the vehicle history module is a crowd sourced vehicle history module configured to utilize at least one of a map, a GPS and a past detection input.

In accordance with another, non-limiting, embodiment, a vehicle guidance system assists a driver in maneuvering a vehicle with respect to an object in a scene. The vehicle includes a wheel having a range of angular positions steered by the driver. The vehicle guidance system includes a steering angle sensor configured to monitor the angular position of the wheel; a camera device configured to capture an original image of a scene having the object; a video processing module (VPM) configured to receive and process the original image from the camera device, detect the object in the original image, receive and process the angular position from the steering angle sensor, generate a dynamic trajectory overlay based on the angular position, and generate a dynamic guidance overlay orientated between the dynamic trajectory overlay and the object; and a human-machine interface (HMI) configured to display a processed image associated with the original image, and the dynamic trajectory and guidance overlays.

Additionally to the foregoing embodiment, the dynamic trajectory overlay is configured to change in format based on alignment with the object for providing driver alert.

In the alternative or additionally thereto, in the foregoing embodiment, the trajectory overlay is configured to change in orientation based on at least one of a change in the angular position and movement of the vehicle The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DETAILED DESCRIPTION

Figure 1:
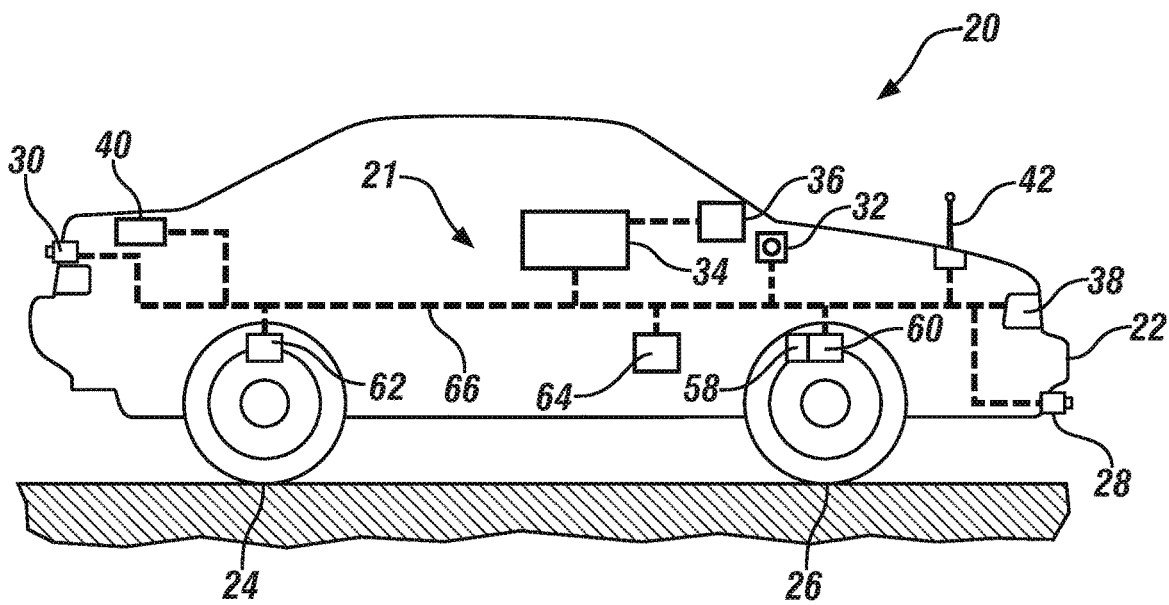
FIG. 1 is a schematic of a vehicle utilizing a vehicle guidance system as one non-limiting example in accordance with the present disclosure.

The following description is merely exemplary in nature and is not intended to limit the present disclosure, its application or uses. It should be understood that throughout the drawings, corresponding reference numerals indicate like or corresponding parts and features. As used herein, the terms module and controller refer to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
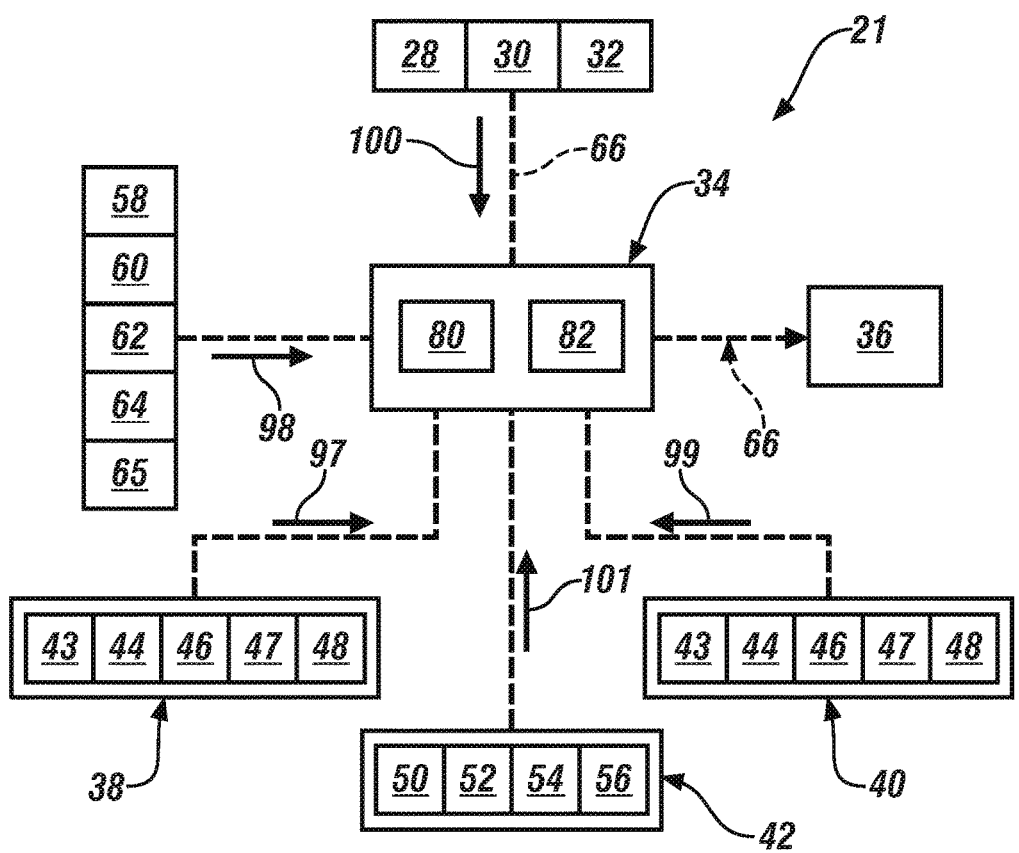
FIG. 2 is a schematic of the vehicle guidance system.

Referring to FIG. 1, an exemplary embodiment of a vehicle 20 is illustrated, and generally includes a frame or chassis 22 carried for transportation upon rearward and forward wheels 24, 26 in accordance with the present disclosure. As is known in the art, the forward and rearward wheels may each include two wheels, and the forward wheels 26 may be constructed and arranged to steer or alter a direction of travel. Referring to FIGS. 1 and 2, the vehicle 20 may be further equipped with a vehicle guidance system 21 configured to dynamically and graphically assist a driver in maneuvering about an obstacle. The vehicle guidance system 21 may include a forward camera device 28, a rearward camera device 30, at least one side camera device 32, a video processing module (VPM) 34, and a human-machine interaction component (HMI) 36. The forward camera device 28 may be a wide field-of-view (FOV) camera device, and may be configured to obtain forward images having a point of view in front of the chassis 22. The rearward camera device 30 may be configured to obtain rearward images having a point of view behind the chassis 22. For example, the rearward camera device 30 may be positioned proximate to a vehicle rear license plate (not shown). The side camera device 32 may be configured to obtain side view images having a point of view to either or both sides of the chassis 22. The images generated by the multiple cameras 28, 30, 32 may be 'stitched' by the VPM 34 as is generally known in the art. It is further appreciated that the camera devices 28, 30, 32 may be synthesized to obtain a top-down view image (see FIG. 3). It is contemplated and understood that any or all of the camera devices 28, 30, 32 may be adjustable to enable a wide range of point-of-views.

The VPM 34 of the vehicle guidance system 21 may be part of a control module and/or may be, or may be part of, one or more Application Specific Integrated Circuit(s) (ASIC), electronic circuit(s), central processing unit(s) (e.g., microprocessor and associated memory and storage) executing one or more software or firmware programs and routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators and other devices. Routines may be executed at regular intervals (e.g., within a range of 3 to 100 milliseconds) during ongoing engine and vehicle operation.

The HMI 36 of the vehicle guidance system 21 may be, or may include, at least one display monitor (e.g., graphic projection display) that may include an interactive touch screen display including a side view mirror display. The VPM 34 may be configured to process raw images received from at least one of the camera devices 28, 30, 32 and output a processed image signal to the HMI 36 for visual display.

The vehicle guidance system 21 may further include a forward detection device module 38, a rearward detection device module 40, an extrinsic or external detection device module 42, and others. The forward and rearward detection device modules 38, 40 may include any number and/or combinations of a light detection and ranging (LiDAR) device 43, a laser device 44, a radar device 46, an ultrasonic device 47, a global positioning system (GPS) device 48, and others. The extrinsic detection device module 42 may include a wireless communication receiver 50, a vehicle-to-vehicle information transceiver 52, a wireless communication transceiver 54, a vehicle-to-infrastructure information receiver 56, and others. The vehicle guidance system 21 may include, or may be configured to receive data signals from, a vehicle speed sensor 58, forward and rearward steering angle sensors 60, 62, a yaw rate sensor 64, a driveline engagement sensor 65 (i.e., forward, reverse, neutral) and others. The vehicle information sensors 58, 60, 62, 64, 65 are depicted to represent vehicle information sensors representing vehicle operation, including vehicle motion parameters, but the disclosure intends to include any such sensors for use by the vehicle guidance system 21. In one embodiment, the camera devices 28, 30, 32, the VPM 34, the HMI 36, the modules 38, 40, 42, and the devices 43, 44, 46, 47, 48 may communicate over a LAN/CAN system 66.

The LiDAR device 43 of the forward and rearward detection device modules 38, 40 may include devices known in the art that measure the distance to, or other properties of information proximate to, the vehicle 20 by illuminating the scene or terrain (e.g., roadway) information proximate to the vehicle 20 with light. The radar devices 46 include devices known in the art utilizing electromagnetic radiation to detect information proximate to the vehicle 20. The laser devices 44 include devices known in the art that may measure the distance to, for example, obstacles proximate to the vehicle 20 by using pulses of microwaves or radio waves projected to the obstacle. The ultrasonic device 47 may be an ultrasonic sensor generally known in the art and used to measure relatively short distances (i.e., about less than three meters). The GPS device 48 is a device known in the art for communicating with resources outside of the vehicle 20, for example, a satellite system. The GPS device 48 may be utilized in conjunction with a three-dimensional database including detailed information relating to a global coordinate received by the GPS device 48 regarding the current location of the vehicle and tracking previously traversed GPS information.

The vehicle-to-vehicle information transceiver 52 of the external detection device module 42 may communicate with other vehicles on a similar, or the same, terrain to monitor and/or transfer information that may be relevant to the terrain. The vehicle-to-infrastructure information receiver 56 may receive monitored information transmitted from infrastructure transmitters located along, or proximate to, a terrain (e.g., roadway, obstacles, object, etc.).

Figure 3:
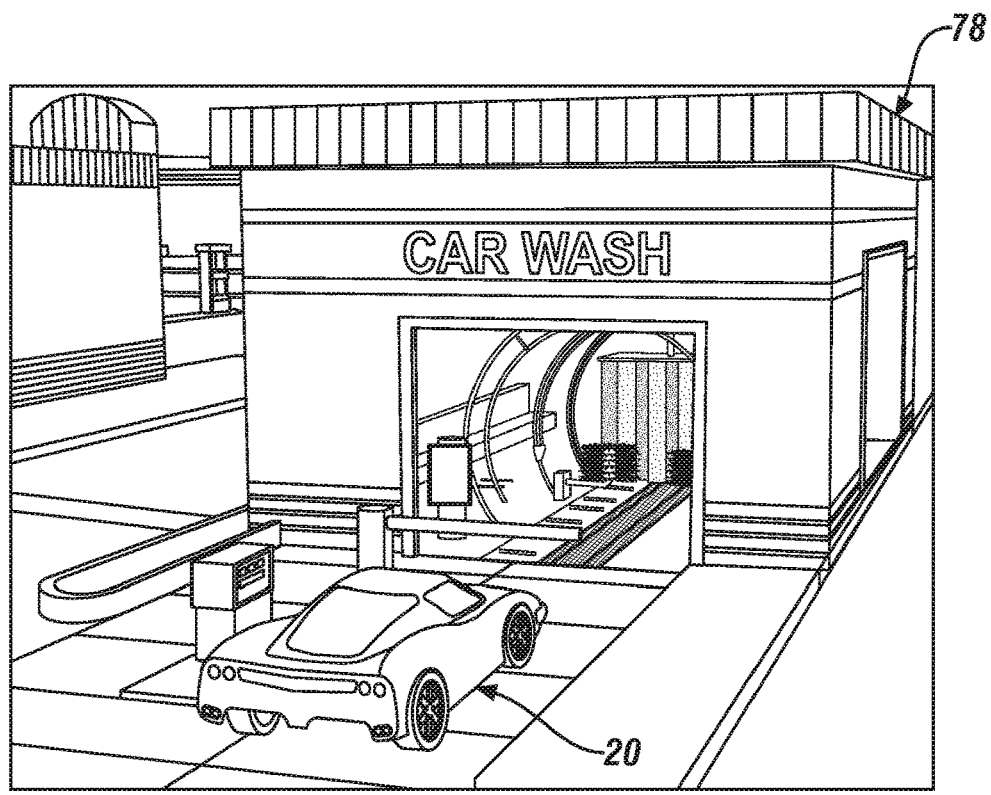
FIG. 3 is a perspective view of the vehicle entering a car wash building as one non-limiting use of the vehicle guidance system.
Figure 4:
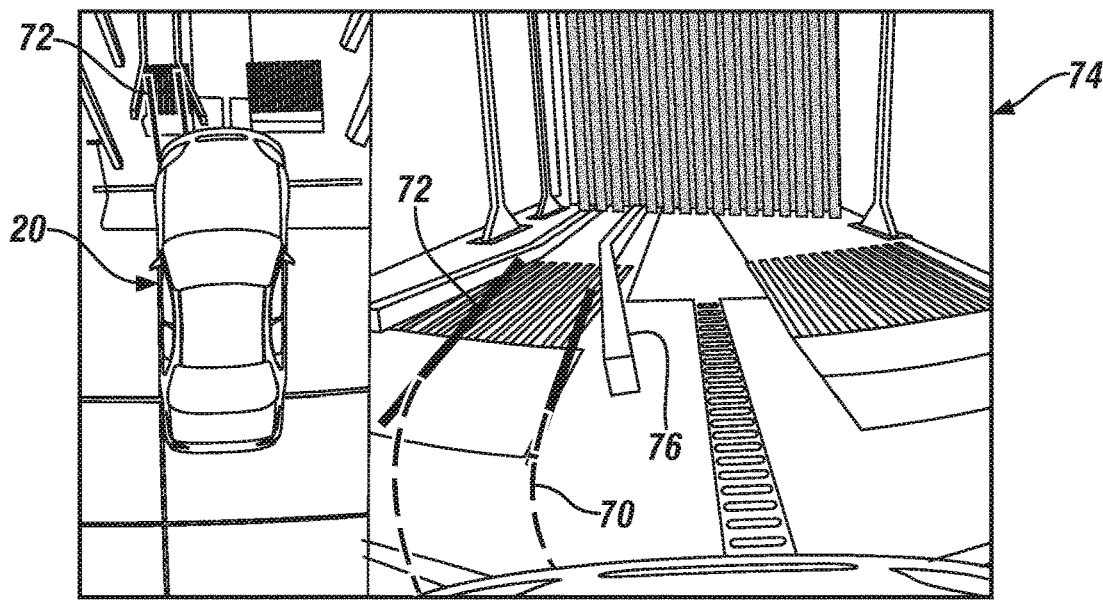
FIG. 4 is an enhance image with guidance and trajectory overlays processed and displayed by the vehicle guidance system.

Referring to FIGS. 3 and 4, the vehicle guidance system 21 is configured to dynamically register at least one of a trajectory overlay 70 and a guidance overlay 72 overlaid upon an image 74 displayed on the HMI 36 to provide visual assistance for the driver to maneuver the vehicle 20 with respect to an object 76. In one, non-limiting, embodiment, the object 76 may be a guide rail that generally functions as an elongated obstacle to prevent the forward wheels 26 of the vehicle 20 from straying too far right or too far left. As illustrated in FIG. 4, the guide rail 76 may be located proximate to an entry point of, for example, a car wash building 78. However, other examples of buildings that may utilize similar guide rails 76 may include vehicle maintenance facilities such as an oil change facility, drive thru facilities such as banks and fast food restaurants, and other buildings. It is further appreciated that the object 76 may not be a rail, and instead may be a post, a portion of a roadway that defines an impression or hole, a curb, and other objects stationary or moving, including other vehicles.

Figure 5:
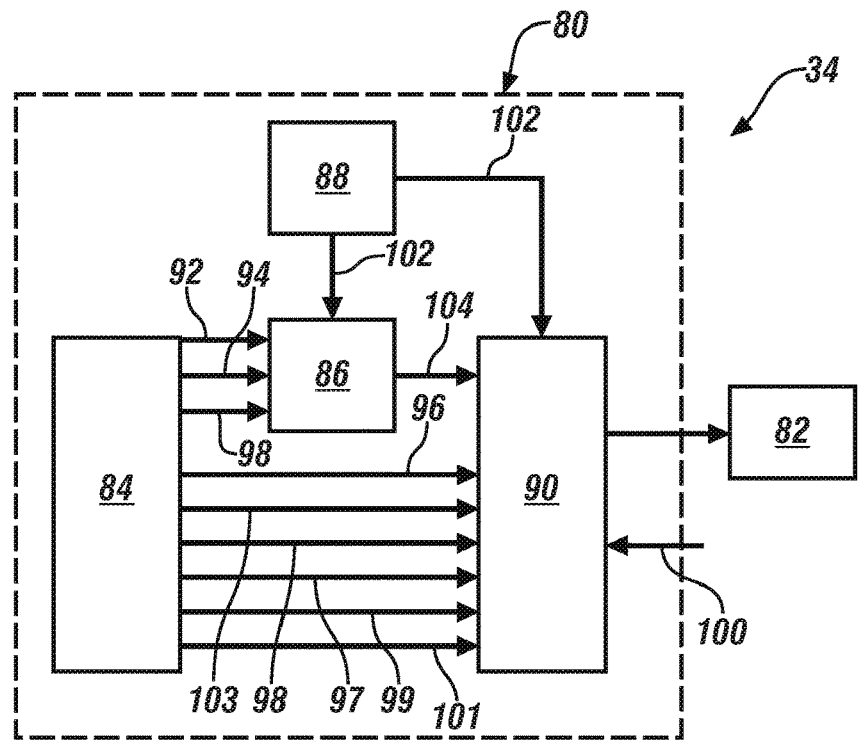
FIG. 5 is a schematic of a video processing monitor of the vehicle guidance system.

Referring to FIGS. 2 and 5, the VPM 34 of the vehicle guidance system 21 may include a camera calibration module 80 and a graphic projection display module 82. The camera calibration module 80 may include an informational module 84, an adjustment module 86, a cropping parameters module 88, and a dynamic registration module 90. The VPM 34 may further include a programmable processor including programming to monitor the camera devices 28, 30, 32, the vehicle information sensors 58, 60, 62, 64, 65 and the detection device modules 38, 40, 42. For simplicity, only the forward camera device 28 will be referred to going forward unless otherwise specified, but it is understood that similar operations may be conducted utilizing the side and/or rearward cameras 32, 30. As will be discussed in greater detail, the vehicle guidance system 21 is adapted to dynamically register at least one graphic or overlay upon an image based on adjusted intrinsic calibration information for the forward camera device 28 and displays the image upon the HMI 36. In general, any one or more of the camera devices 28, 30, 32 and associated components may be part of a vision-based module for object detection.

The informational monitor 84 of the camera calibration module 80 may be configured to monitor intrinsic calibration information 92 for the forward camera device 28, extrinsic calibration information 94 for the forward camera device 28, radial distortion parameters 96 for the forward camera device 28, vehicle information 98, forward detection information 97, and rearward detection information 99. The informational monitor 84 may be further configured to receive and/or store external information 101 and internal historical information 103 for output to the dynamic registration module 90. The intrinsic calibration information 92 may include focal length and optical center parameters for the forward camera device 28. Alternatively, the intrinsic calibration information 92 may include a plurality of pixels associated with the original image. The camera extrinsic calibration information 94 monitored by the informational monitor 84 may include positional parameters and orientation parameters for the forward camera device 28. The radial distortion parameters 96 may include parameters applied to a captured image to correct features in the captured image that are straight but appear curved. Radial distortion is known in the art for wide FOV camera devices, and will not be discussed herein.

Vehicle information 98 may include vehicle speed obtained from the vehicle speed sensor 58, a forward steering angle obtained from the forward steering angle sensor 60, a rearward steering angle obtained from the rearward steering angle sensor 62, a vehicle yaw rate obtained from the yaw rate sensor 64, and whether or not the vehicle is in gear via the driveline engagement sensor 65. Forward detection information 97 and the rearward detection information 99 may include data received from the respective forward and rearward detection device modules 38, 40 (i.e., from any one or more of the devices 43, 44, 46, 47, 48). The external information 101 coordinated or stored by the informational monitor 84 may be received by any one of the receivers and/or transceivers 50, 52, 54, 56 of the external detection device module 42. As illustrated in FIG. 5, the monitored intrinsic and extrinsic calibration information 92, 94 may be inputted to the adjustment module 86. The radial distortion parameters 96, the vehicle information 98, forward and rearward detection information 97, 99, external information 101, internal historical information 103, and an original or raw image 100 from the forward camera device 28 are all input to the dynamic registration module 90.

The external information 101 may generally include any information electronically transmitted into the vehicle 20 (i.e., generated externally from the vehicle 20) and may include external historical information generally provided by a vehicle-to-vehicle (V2V) system, or module, associated with the V2V transceiver 52, a vehicle-to-infrastructure (V2I) system, or module, associated with the V2I transceiver 56, systems with remote servers such as an OnStar module (i.e., by the OnStar Corporation, a subsidiary of General Motors Corporation), and others. The forward and rearward detection information 97, 99 may include information generated by any one or more of the devices 43, 44, 46, 47, 48. The internal historical information 103 is generally that information internal to the vehicle 20 and may be generated via previous encounters with the same object 76. It is understood that the term 'historical information' as used herein may mean external or internal historical information.

A cropped image (not shown) may be generated based on cropping parameters 102 to exclude undesirable content from the original image 100. In one example, the cropping parameters module 88 inputs the cropping parameters 102 into the adjustment module 86 and the dynamic registration module 90. Accordingly, the cropped image may be generated within the dynamic registration module 90 based on the cropping parameters 102 to exclude the undesirable content from the original image 100. The cropping parameters 102 may be predetermined based on dimensions of the selected vehicle 20 at which the forward camera device 28 is positioned. Other examples may include cropping parameters 102 that are user or driver defined to encompass a desired area of interest within the original image 100 and exclude undesirable content outside of the desired area of interest.

If the cropping parameters 102 are user defined, the cropping parameters may be dynamically updated in response to the user input adjusting the desired area of interest. When the cropping parameters are dynamically updated, the intrinsic calibration information 92 is dynamically adjusted in response to the dynamically updated cropping parameters 102. Furthermore, the user input adjusting the desired area of interest may include adjusting a zoom range factor to one of increasing or decreasing the desired area of interest. It is contemplated and understood that dynamically adjusting cropping parameters may be associated with changing the zoom range factor of a captured image.

The intrinsic calibration information 92 may be adjusted based on a relationship to the cropping parameters 102. In one embodiment, the adjustment module 86 adjusts the monitored intrinsic calibration information 92 based on a relationship to the cropping parameters 102. Accordingly, adjusted intrinsic calibration information 104 may be inputted to the dynamic registration module 90 from the adjustment module 86. It should now be appreciated that the cropping of the image 100 based on the cropping parameters 102 may require the intrinsic calibration information 92 to be adjusted so the overlays 70, 72 may be accurately and dynamically registered upon the cropped image 74 for eventual display upon the HMI 36. Further detail concerning the cropping of images is taught in U.S. Patent Application Publication 2013/0321629, assigned to GM Global Technology Operations LLC, filed May 31, 2012, and incorporated herein by reference in its entirety.

Adjustment or calibration of the extrinsic calibration information 94 may facilitate improved image processing or raw images captured by the camera device(s) 28, 30, 32. More specifically, the extrinsic calibration information 94 may be applied and adjusted in a self-check calibration process to assure the detection of the object 76 (i.e., actual location) properly aligns to the image 74. With proper alignment, the guidance overlay 72 may be properly located upon the image 74. Utilizing the adjustability of the extrinsic calibration information 94, the VPM 34 may apply different techniques to optimize the images captured by the camera device(s) 28, 30, 32 while the vehicle 20 is moving (i.e. being driven). The calibration technique used is dependent upon the extrinsic calibration information 94 available. In one embodiment, the extrinsic calibration information 94 may include data necessary to calculate the camera device's height above the ground and the camera device's orientation in vehicle coordinates.

In one example, the vehicle 20 may be traveling in a substantially straight line, and stationary points on the ground (not shown) may be tracked in successive video frames while the vehicle speed sensor 58 is read to calculate the distance traveled by the vehicle 20 between camera images. An algorithm may be applied by the VPM 34 to determine the translation and rotation between camera coordinates for different positions of the camera device(s) 28, 30, 32 which are measured in the camera coordinates at a first position. The algorithm may also determine a ground plane representation in the camera coordinates based on at least two points on the ground and the camera translation direction. The algorithm may then identify the camera's height above the ground and the camera rotation in the vehicle coordinates. Further detail concerning the self-calibration of extrinsic camera parameters/information is taught in U.S. Patent Application Publication 2009/0290032, filed May 22, 2008; and U.S. Patent Application Publication 2015/0329048, filed May 12, 2015, and both assigned to GM Global Technology Operations LLC, and both incorporated herein by reference in their entirety.

Figure 6:
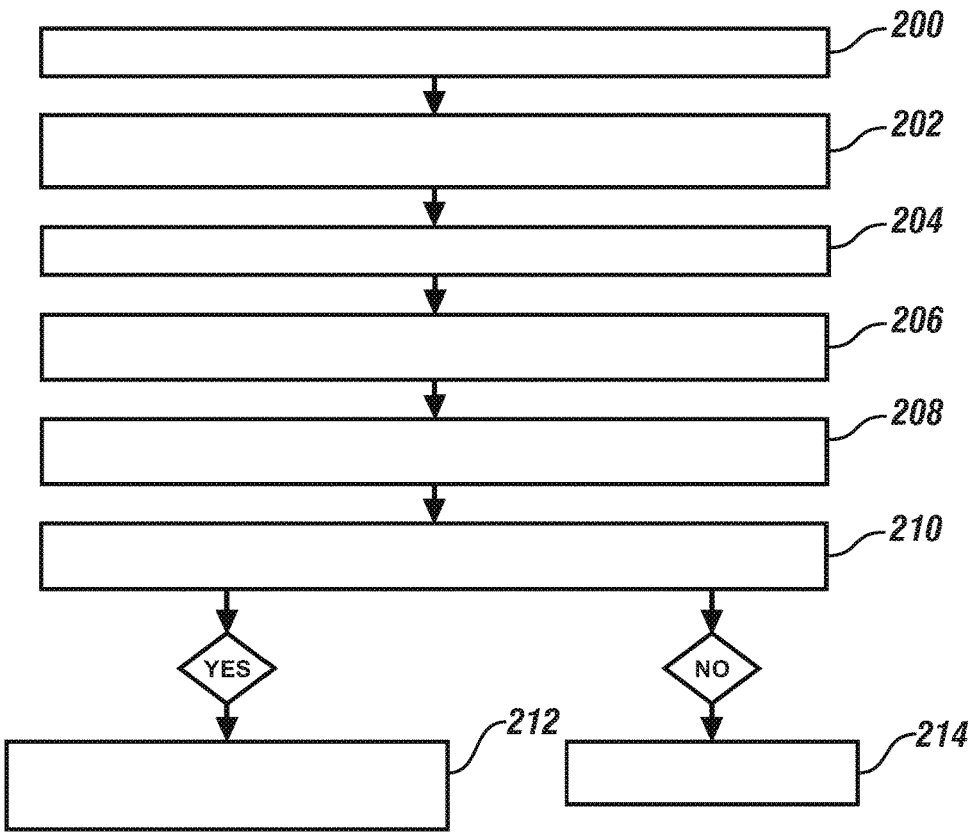
FIG. 6 is a flow chart of a method of operating the vehicle guidance system.

Referring to FIG. 6, one embodiment of a computer implemented method of operation related to the vehicle guidance system 21 may include as block 200 the generation of the original image 100 of a scene containing the object 76

(see FIG. 4). The scene in the present example may be the entrance of a car wash as illustrated in FIG. 3. Generation of the image 100 may be a forward view captured by the forward camera device 28 and associated with the right side of the enhanced or processed image 74 (see FIG. 4), and/or may be a top-down view generated by a surrounding view system (not shown) that may use all of the camera devices 28, 30, 32 (see FIG. 1), and as generally depicted as the left side of the enhanced image 74. The object 76 in the present example is a tire guide rail as previously described. Because the object 76 is forward of the vehicle 20 and the vehicle is generally moving in the forward direction, it is understood that certain components of the vehicle guidance system 21 as previously described are pertinent and other described components may not be pertinent to the present example of the system application (i.e., those components relative to the rear of the vehicle).

At block 202, an angular position (see arrow 98 in FIG. 2 representing an angular position signal) is outputted by the forward steering angle sensor 60 and received by the VPM 34. Also generally received by the VPM 34, may be the intrinsic calibration information 92 as previously described. Both the angular position 98 of the forward wheels 26 and the intrinsic calibration information 92 relative to the forward camera device 28 are processed by the computer-based VPM 34 to determine a vehicle trajectory. The vehicle trajectory is generally an estimation of where the vehicle 20 is predicted to travel with the current angular position 98 of the forward wheels 26, and possibly with the current angular position of the rearward wheels 24 with enhancements/adjustments provided via the intrinsic calibration information 92.

At block 204; which may occur simultaneously too, after, or before block 202, the original image 100 from the forward camera device 28 may be used to at least in-part detect the object 76. That is, object recognition software may be used to recognize an object as a particular target or object of concern. The object recognition software may be based on a single original image (i.e., appearance-based software) in one embodiment, or may apply a plurality of successive images through motion (i.e., motion-based software) of the vehicle 20 as another embodiment. The successive images may be part of a 'structure from motion' technique or multi-view depth/3d reconstruction technique to detect the object 76.

At block 206, the object detection results may be independently created, enhanced, or optimized, through the use of historical data/information. Historical data/information may be derived from one or a combination of a host vehicle module and a crowd sourced vehicle module. Either of the host or crowd sourced vehicle modules may gain historical data from a map, GPS, and/or past detection input(s). The host vehicle module is associated with past learning of the present vehicle 20 for object detection. The crowd sourced vehicle module is associated with the transfer of historical data from other vehicles and to the host vehicle 20 (i.e., a form of 'crowd sourcing and learning' from history).

In one example, the vehicle 20 may have visited/frequented the car wash building 78 in the past. During a past visit, the vehicle guidance system 21 may have used the surrounding view system (i.e., three or four cameras 28, 30, 32), the GPS device 48, and/or may use a map from an internal database or external system (with the map data transmitted via the external detection device module 42). This historical information, which may generally be the internal historical information 103 (see FIG. 5) may thereby be used to enhance detection capability of the object 76. The internal historical information 103 in this example may not only include a 360 degree image of the object 76, but may also include information on location, shape, color, etc.

In another embodiment pertaining to block 206, the vehicle guidance system 21 may query neighboring vehicles utilizing a V2V system and the V2V transceiver 52 of the external detection device module 42. In this embodiment, the vehicle 20 may be waiting behind another vehicle preparing to enter the car wash building 78. The vehicle 20 may be configured to receive data from the forward vehicle (i.e., as external historical information 101, see FIGS. 2 and 5).

In yet another embodiment pertaining to block 206, the vehicle guidance system 21 may query an external system that may have a remote server for prior knowledge related to the object 76. One example of an external system may be an OnStar system.

At block 208, the VPM 34 may output a signal associated with the necessary information for the HMI to visually display the enhanced image 74 with the trajectory overlay 70. The trajectory overlay 70 generally represents the projected trajectory of the forward wheels 26 of the vehicle 20, displayed for viewing by the driver. As best shown in FIG. 4, the enhanced image 74 may be displayed in a variety of ways including a top-down view (see left side of display in FIG. 4) and a forward view (see right side of display). The projected trajectory and thus the trajectory overlay 70 is generally dynamic and may visually change upon a change of the image scene due to, for example, movement of the vehicle 20, and may change upon the driver changing an angular position of the forward wheels 26. It is further contemplated that the visual display of the object 76 with respect to the trajectory overlay 70 may, in itself, inform the driver on whether his/her projected trajectory is on course.

Also at block 208, the VPM 34 may calculate and the HMI 36 may visually display the guidance overlay 72. The guidance overlay 72 may further assist the driver in establishing a correct trajectory by providing, for example, a wheel path that extends in front of the object 76 (i.e., the space between the two solid lines representing the guidance overlay 72).

At block 210, the VPM 34 may calculate whether the trajectory overlay 70 is properly aligned with respect to the detected object 76. Depending upon whether the object 76 is aligned or not aligned, the trajectory overlay 70 may change color, may change in line style format, and/or may produce an audible indication. In one example, if the object 76 is aligned to the trajectory overlay 70, then at block 212 the trajectory overlay 70 may change color (e.g., red to green), thereby alerting the driver that he/she is on course. At block 214, if the VPM 34 determines there is misalignment, the color of the trajectory overlay 70 may remain the same alerting the driving to change the angular position of the forward wheels 26.

Figure 7:
FIG. 7 is a partial flow chart of a second embodiment of a method of operating the vehicle guidance system.

Referring to FIG. 7, a second embodiment of a method of operating the vehicle guidance system 21 is illustrated in-part, and is similar to the first embodiment except that block 204 (see FIG. 6) is generally replaced with block 300. More specifically, the object recognition technique utilizing the image(s) 100, may be replaced with an object detection technique that applies 'sensor fusion' (i.e., a sensor fusion module). In this embodiment, V2I communication (i.e., via V2I transceiver 56) may be applied where the infrastructure is generally the car wash building 78 and the external information 101 transmitted may include any one or more of: object location, object shape, object color, and others. Alternatively or in addition to the V2I generated external information 101, the object 76 may be detected utilizing any one or more of the devices of the forward detection device module 38. For example, the vehicle guidance system 21 may use the ultrasonic device 47 and/or the short range radar device 46 to detect the object. If the object 76 is a metal rail, the radar device 46 may be a preferred device for such detection because of the metal composition of the rail. For example, the sensor fusion module may include or may apply data fused together from at least two of the ultrasonic device 47, the radar device 46, and the LiDAR device 43.

Figure 8:
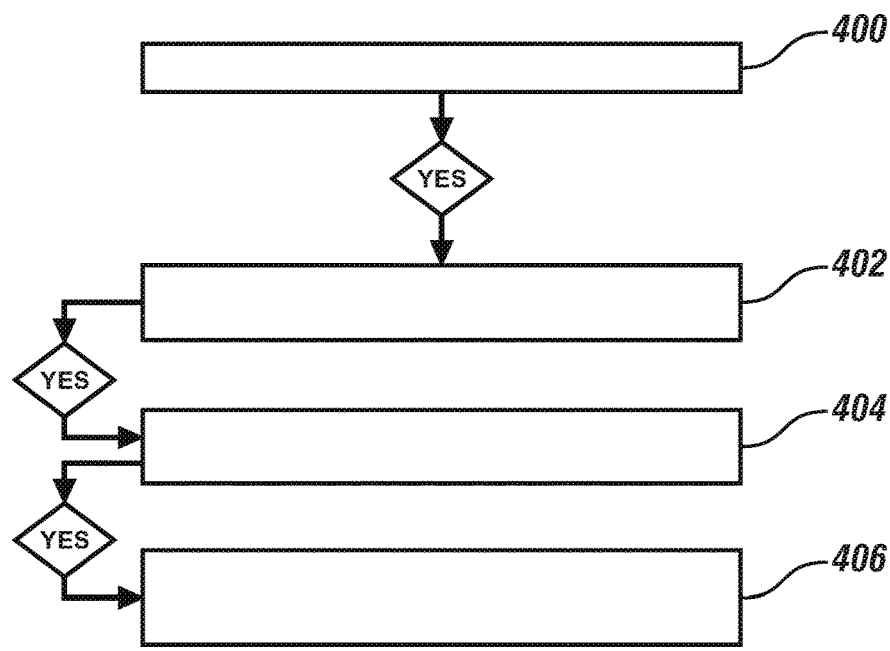
FIG. 8 is a flow chart of a method of self-checking the vehicle guidance system.

Referring to FIG. 8, a method of self-checking and/or self-calibrating the vehicle guidance system 21 is illustrated. At block 400, the VPM 34 may verify the vehicle 20 is moving in a forward direction via the vehicle speed sensor 58. At block 402, the VPM 34 may verify the vehicle 20 is translating in a substantially straight or linear direction via the forward and/or rearward angle sensors 60, 62. At block 404, the VPM 34 may verify the vehicle is moving on its own volition (i.e. locomotion) via the driveline engagement sensor 65 (i.e., the driveline is engaged to move forward as opposed to being in neutral or reverse). At block 406, the VPM 34 may adjust the extrinsic calibration information 94 and utilize the vehicle information 98 to enhance the image (s) of at least one of the camera device(s) 28, 30, 32, thereby aligning the image of the scene to the detection of the object 76. That is, in at least future applications, the captured image will be better aligned to the guidance overlay 72.

Figure 9:
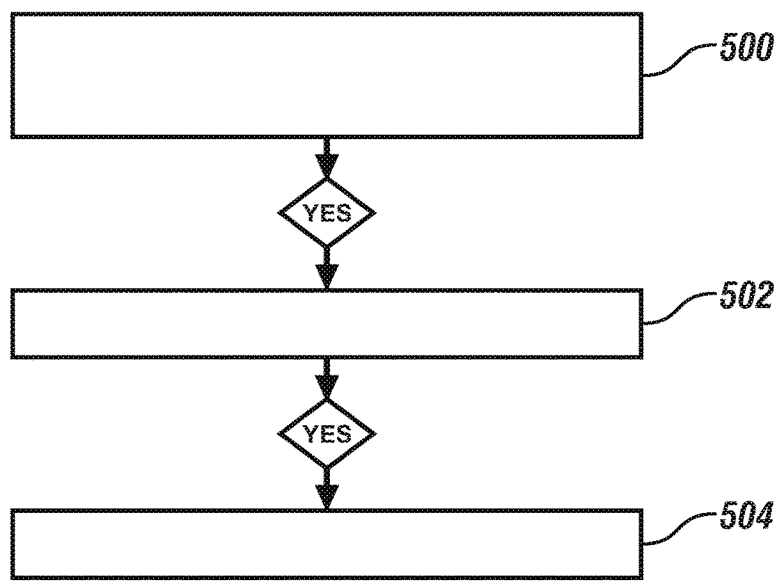
FIG. 9 is a flow chart of a second embodiment of self-checking the vehicle system when in, for example, a car wash building.

Referring to FIG. 9, a method of self-checking and/or self-calibrating the vehicle guidance system 21 is illustrated when the system is applied to an example of the car wash building 78 application. In accordance with this embodiment the vehicle guidance system 21 may first verify the vehicle is in a car wash. This verification will provide the system with external information with regards to the object (e.g., a tire guide rail, etc.) and through this verification direct the VPM 34 on which sensors, devices, and information may be pertinent to achieve a self-calibration while in the car wash. More specifically and at block 500, the VPM 34 may verify vehicle speed is zero utilizing the vehicle speed sensor 58, and/or, may verify the vehicle 20 is in the neutral position utilizing the driveline engagement sensor 65. If yes and at block 502, the vehicle guidance system 21 may utilize the VPM imaging to verify the vehicle 20 is in motion (e.g., forward motion) with respect to a surrounding environment generally known to be stationary. Such motion may be indicative that the car is resting on a moving car wash belt and thus in a substantially straight direction. Moreover, since the vehicle is not moving on its own volition, the vehicle guidance system 21 may then determine that there is no need to verify or monitor the forward or rearward angle sensors 60, 62.

At block 504, the VPM 34 may adjust the extrinsic calibration information 94 and utilize the vehicle information 98 to enhance the image(s) captured by at least one of the camera device(s) 28, 30, 32, thereby aligning the image of the scene to the detection of the object 76. That is, in at least future applications, the captured image will be better aligned to the guidance overlay 72. It is further contemplated and understood that if a one camera device is utilized in this self-check process then one calibration technique may be applied, and if multiple camera devices (i.e., surround-view camera system) are utilized, then another calibration technique may be applied.

The vehicle guidance system 21 may generally be an autonomous system that may not include guidance or trajectory overlays. That is, the vehicle guidance system 21 may have the capability to maneuver the vehicle 20 into, for example, a car wash building without driver intervention. In this embodiment, the VPM may use the camera images to detect the object(s) or guide rails using structure from motion (SFM) or multi-view depth/3d reconstruction techniques to detect the above ground rail. For some vehicle platforms (e.g., Corvette), a front stereo pair may be used to detect rails and establish rail height. A guideline may then be generated based on detected rail position and height. Aspects of this same technique may be applied to the vehicle guidance system 21 that utilizes guideline and trajectory overlays with driver intervention. It is further contemplated that various controls and actuation techniques may be applied. Non-limiting examples of such control and actuation techniques is taught in US Patent Publication 2013/0274985, titled: System and Method for Vehicle Lateral Control, filed Apr. 16, 2012, assigned to GM Global Technology Operations, LLC, and incorporated herein by reference in its entirety.

Benefits and advantages of the present disclosure include dynamic overlays that assist a driver in maneuvering about objects with ease, and without risk of damaging components of the vehicle. Other advantages may include enhanced images of scenes, more accurate object detection, and a novel vehicle guidance system that may be incorporated into a vehicle by substantially using pre-existing components.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A vehicle guidance system for assisting a driver in maneuvering a vehicle with respect to an object in a scene, the vehicle including a wheel having a range of angular positions steered by the driver, the vehicle guidance system comprising:
   a steering angle sensor configured to monitor the angular position of the wheel;
   a camera device configured to capture an original image of a scene having the object;
   at least one of the vehicle-to-infrastructure (V2I) transceiver, a vehicle-to-vehicle (V2V) transceiver, and a remote server transceiver;
   a video processing module (VPM) configured to receive and process the original image from the camera device, detect the object in the original image, receive and process the angular position from the steering angle sensor, generate a vehicle trajectory based on the angular position, and orientate the vehicle trajectory with regard to the object, the VPM including historical information to at least in-part assist the VPM in detection of the object, the historical information including external historical information received from at least one of the V2I transceiver, the V2V transceiver, and the remote server transceiver, the external historical information including at least one of location of the object, shape of the object and color of the object, and the external historical information is received via the V2I transceiver;

a vehicle-to-infrastructure transceiver configured to receive information based on at least one of location, shape, and color of the object to assist in detection of the object; and a human-machine interface (HMI) configured to display a processed image associated with the original image and a trajectory overlay associated with the vehicle trajectory from the VPM, and wherein the trajectory overlay is overlaid upon the processed image with respect to the object.

2. The vehicle guidance system set forth in claim 1, wherein the VPM includes object recognition software for at least assisting in detection of the object.

3. The vehicle guidance system set forth in claim 2, wherein the object recognition software is appearance-based software.

4. The vehicle guidance system set forth in claim 2, wherein the object recognition software is motion-based software.

5. The vehicle guidance system set forth in claim 1, further comprising:
an external detection device module in communication with the VPM, the external detection device module including at least one of the vehicle-to-infrastructure transceiver_ and a vehicle-to-vehicle transceiver configured to at least in-part assist the VPM in detection of the object.

6. The vehicle guidance system set forth in claim 1, wherein the historical information includes internal historical information electronically stored by the VPM.

7. The vehicle guidance system set forth in claim 6, wherein the internal historical information is recorded by the vehicle guidance system from a previous visit of the vehicle to the scene.

8. The vehicle guidance system set forth in claim 7, further comprising:
a surrounding view system including the camera device being a forward camera device, a rearward camera device and at least one side camera device configured to capture images to generate the internal historical information.

9. The vehicle guidance system set forth in claim 8, further comprising:
a global positioning system (GPS) device configured to detect a location of the object.

10. The vehicle guidance system set forth in claim 1, further comprising:
at least one of an ultrasonic device and a radar device configured to at least assist in detection of the object.

11. The vehicle guidance system set forth in claim 10, further comprising:
a surrounding view system including the camera device being a forward camera device, a rearward camera device and at least one side camera device configured to capture images of the object from a previous visit to generate at least a portion of internal historical information stored by the VPM to enhance detection of the object.

12. The vehicle guidance system set forth in claim 10, wherein at least one of the ultrasonic device and the radar device are configured to generate internal historical information from a previous visit to enhance detection of the object.

13. The vehicle guidance system set forth in claim 1, further comprising:
at least one of a vehicle-to-vehicle (V2V) transceiver, and a remote server transceiver configured to receive external historical information and send the external historical information to the VPM for object detection enhancement.

14. The vehicle guidance system set forth in claim 1, wherein the VPM is configured to adjust extrinsic calibration information to enhance the processed image.

15. The vehicle guidance system set forth in claim 1, further comprising:
at least one of a vision-based module for object detection, a vehicle-to-infrastructure (V2I) module for object detection, a sensor fusion module for object detection, a vehicle-to-vehicle (V2V) module for object detection, an OnStar module for object detection, and a vehicle history module for object detection.

16. The vehicle guidance system set forth in claim 15, further comprising:
at least two of an ultrasonic device, a radar device, and a light detection and ranging (LiDAR) device, and wherein the sensor fusion module is configured to fuse data from the at least two of the ultrasonic device, the radar device, and the LiDAR device.

17. The vehicle guidance system set forth in claim 15, wherein the vehicle history module is a host vehicle history module configured to utilize at least one of a map, a GPS, and a past detection input.

18. The vehicle guidance system set forth in claim 15, wherein the vehicle history module is a crowd sourced vehicle history module configured to utilize at least one of a map, a GPS and a past detection input.

19. The vehicle guidance system set forth in claim 1, wherein the information comprises monitored information transmitted from infrastructure transmitters located with respect to a terrain.

* * * * *